W. G. LEVISON.
APPARATUS FOR DETECTING AND EXHIBITING THE FLUORESCENCE OF FLUORESCENT SUBSTANCES.
APPLICATION FILED NOV. 3, 1908.
947,246.
Patented Jan. 25, 1910.
3 SHEETS—SHEET 1.
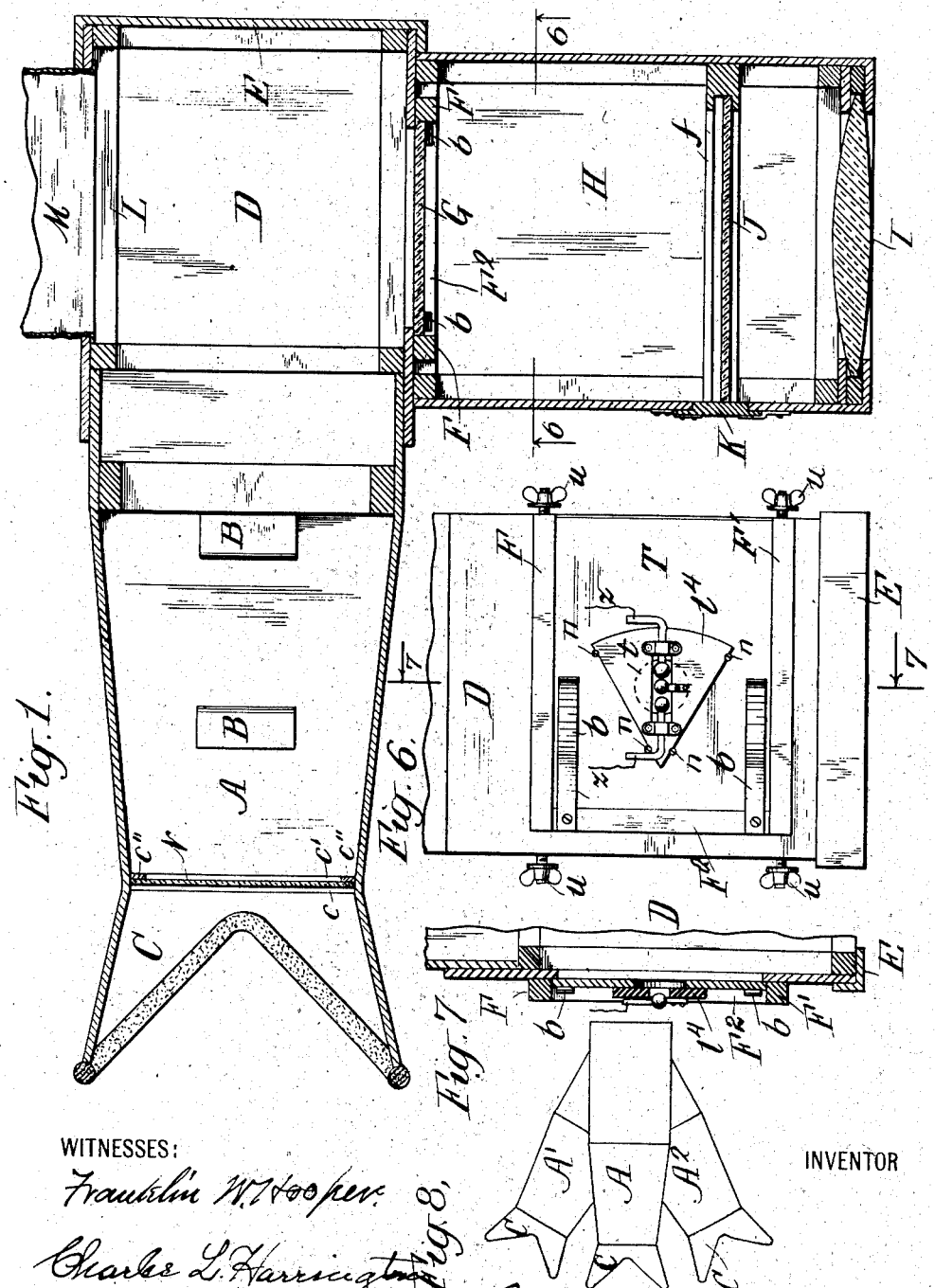

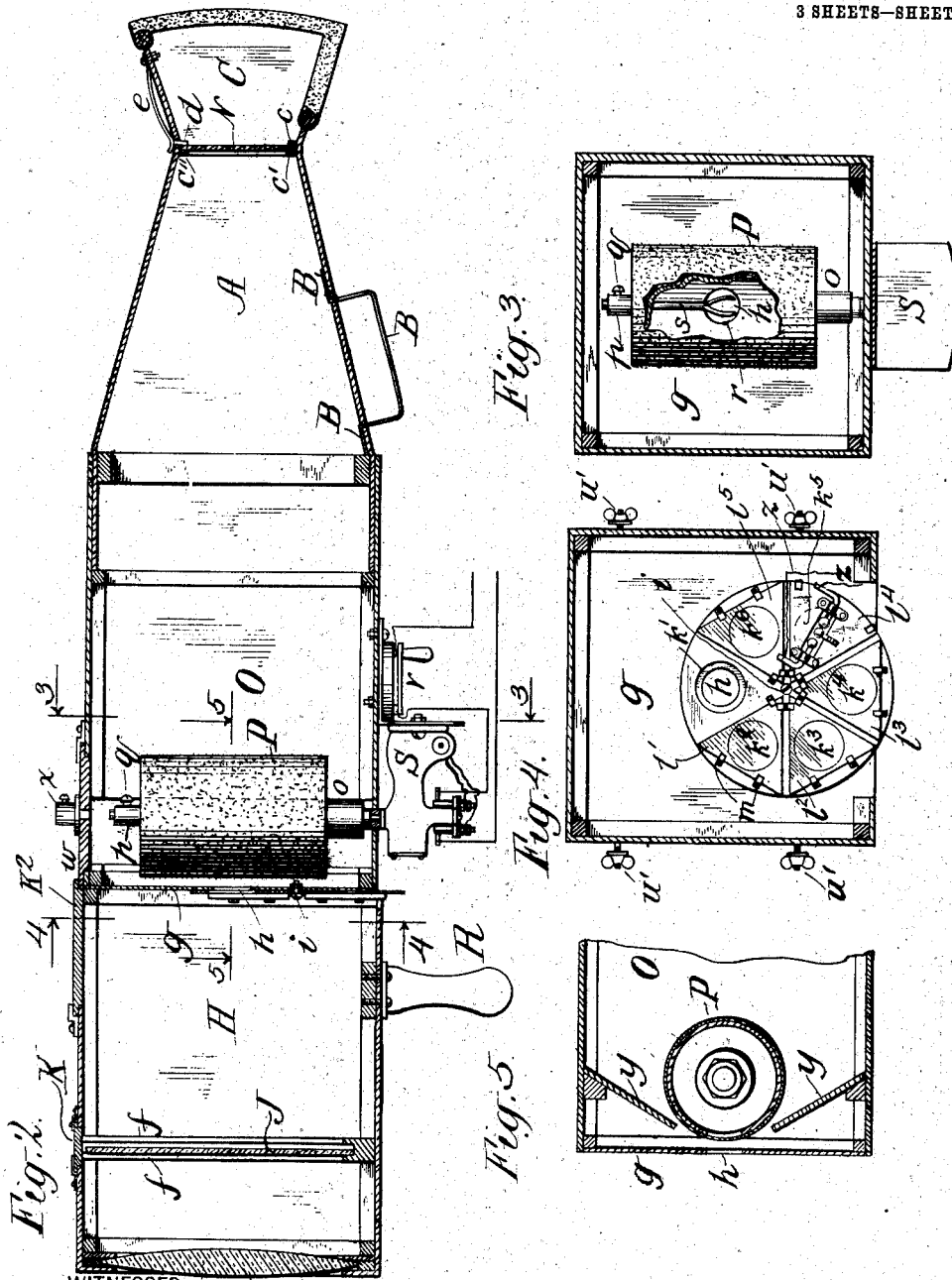

W. G. LEVISON.
APPARATUS FOR DETECTING AND EXHIBITING THE FLUORESCENCE OF FLUORESCENT SUBSTANCES.
APPLICATION FILED NOV. 3, 1908.
947,246.
Patented Jan. 25, 1910.
3 SHEETS—SHEET 3.
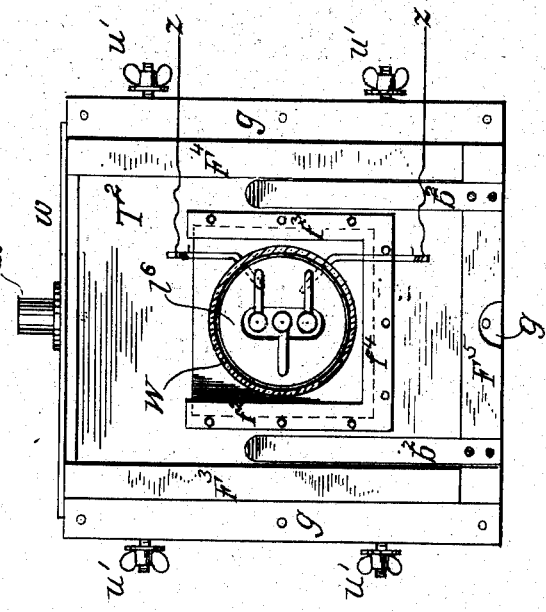
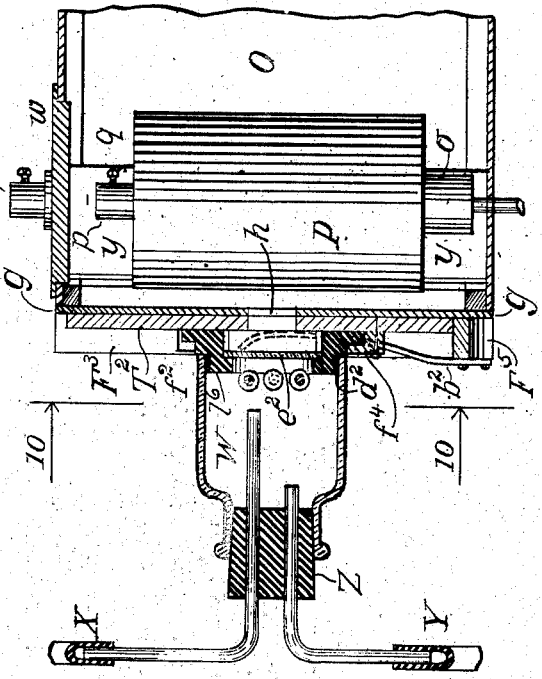
WITNESSES:
Herbert B. Baldwin
Irving W. Fay
INVENTOR
Wallace Goold Levison.

UNITED STATES PATENT OFFICE.

WALLACE GOOLD LEVISON, OF BROOKLYN, NEW YORK.

APPARATUS FOR DETECTING AND EXHIBITING THE FLUORESCENCE OF FLUORESCENT SUBSTANCES.

947,246. Specification of Letters Patent. Patented Jan. 25, 1910.

Application filed November 3, 1908. Serial No. 460,975.

*To all whom it may concern:*

Be it known that I, WALLACE GOOLD LEVISON, a citizen of the borough of Brooklyn, county of Kings, and State of New York, have invented a new and useful improvement in apparatus in the class of fluoroscopes for detecting and exhibiting the fluorescence of fluorescent substances for various practical purposes; and the following is a description of my invention, such as will enable others skilled in the arts to which it belongs to make and use it, reference being made to the accompanying drawings.

It consists of a case or box which is portable if constructed of suitable light materials as cardboard or aluminum and of several sections fitting together as herein described for the practical use of jewelers, analytical chemists and others, or it may be constructed of heavier material for permanent installation as a museum exhibit.

It consists in part of additions to the apparatus described in my previous patent No. 883,653 March 31, 1908, which for convenience of explanation is included in the present description but only the additional parts which greatly increase its utility are the object of this application.

In the drawings Figure 1 is a horizontal section about half size of one disposition of the parts of the apparatus. Fig. 2 is a vertical section on a smaller scale of another disposition of the parts of the apparatus; Fig. 3 is a sectional view taken on the line 3, Fig. 2, looking in the direction of the arrow or as seen from the eye shield, with the cylinder partly cut away to show an aperture in it for the admission of light; Fig. 4 is a sectional view taken on the line 4 Fig. 2 looking in the direction of the arrow. Fig. 5 is a sectional view taken on the line 5 Fig. 2 looking in the direction of the arrow. Fig. 6 is a side elevation of an attachment for producing a spark gap light as it appears in place at G, Fig. 1. Fig. 7 is a horizontal section of Fig. 6 through the line 7 Fig. 6. Fig. 8 is a triplex modification of the eye shield C, Fig. 1. Fig. 9, is a vertical longitudinal section of part of the chamber O Fig. 2 provided with a rabbeted recess similar to that shown in Figs. 1, 6, and 7, instead of the revoluble disk shown in Fig. 4, and with a spark gap lamp inclosed in a container for using various gases, in place in the recess. Fig. 10. is a sectional view taken on the line 10. Fig. 9 looking in the direction of the arrows.

In the drawings like letters indicate like parts.

A Figs. 1, 2 and 8 is a case similar in construction to that of an ordinary X ray fluoroscope without the X ray screen which is provided with the usual handle B, Figs. 1, and 2 and chenille edged shield for the eyes C, Figs. 1, 2 and 8. Within the eye shield is a screen N, Figs. 1, and 2, of a yellow or other colored transparent material as glass which is held in place by a groove $c$, $c'$, a frame $c''$ and a pin $d$, Fig. 2 and is removable by lifting the pin $d$ by the spring $e$ to which it is attached.

D Fig. 1 is a separate chamber which fits telescopically over the posterior end of the eye shield case C, and is provided with a close fitting cover E, Figs. 1 and 6. This chamber D, Fig. 1, is also provided with opposite openings in its two sides. The one on the right hand side of a person looking in the eye shield C is surrounded with a frame F, F' F'', Figs. 1, 6 and 7 which forms a rabbeted recess to permit the insertion of ray filters which may be suitable liquids inclosed in flat glass bottles, or cells, or plates of suitably colored glass as G Fig. 1, and also of the board T, Fig. 6, perforated at $t$, and supporting the appliance $l^4$, Figs. 6, 7 and 4, or the board $T^2$ supporting the spark gas lamp $l^6$ Figs. 9 and 10. Either of these is held in place by the springs $b$ $b$, Figs. 1, 6 and 7. To this side of the chamber D there is fitted at right angles the extension H, Figs. 1 and 2, the top and bottom of which project two inches beyond its sides. These projections extend over and under the chamber D, in Fig. 1, and are slotted to correspond to thumb screws, shown at $u$ $u$ $u$ $u$, Fig. 6, which are fixed to the top and bottom of D, in the wooden corner strips, whereby the chamber D is strengthened. The chamber H may thereby be clamped to D, or removed at pleasure. The chamber H is provided with a door not shown in the section, similar to that shown at K, Figs. 1 and 2, but directly over G, Fig. 1, so that ray filters such as G may be inserted or withdrawn without detaching the chamber H. The chamber H is provided at its posterior end with a plano convex or other lens I, Figs. 1 and 2, and is of such a length that the cone of condensed light formed when the direct rays of the sun, or a beam of parallel rays from a lantern are transmitted through the lens I, Fig. 1, and the ray filter aperture G, Fig. 1, comes to a focus about 1½ inches within the section D, Fig. 1. This lens I, Figs. 1 and 2, should be such as is generally used for the front lens of the familiar triple lantern condenser, about 5½ inches in diameter, and have a focal length of about 9 inches, although smaller or larger lenses may be used.

J, Figs. 1 and 2 is another ray filter, which may be a sheet of glass as shown, or a cell or a flat bottle containing a liquid, mounted on a suitable frame, of such a size that it may be inserted in a grooved light locked recess $ff$, through the door K, Figs. 1 and 2. Thus an intense focus of light from the lens I, colored as desired, either by a ray filter G or a ray filter J, or both combined, is formed about midway within the dark chamber D.

The opposite opening on the left hand side of the dark chamber D, shown in the horizontal sectional Fig. 1, at L is to be large enough to admit the hand. It may be closed by a door or it may have attached to it a sleeve made of flexible material such as suède kid, a part of which is shown at M, Fig. 1. Through this sleeve the hand and wrist may be inserted and thus a gem, a mineral specimen or any other object may be held in the hand within the dark chamber D, and turned about at pleasure for examination on all sides in the focus of intense light produced by the lens I and admitted through the ray filter G or J or both combined. In case it is preferred to use the cover E Figs. 1 and 6, or an ordinary door as previously mentioned for the opening L, in place of the sleeve M Fig. 1, to introduce specimens for a lengthy examination, instead of holding them in the hand through the sleeve M, the specimens may be supported in ordinary pin clamps or on a block of wood in the chamber D.

In order to facilitate the handling of the apparatus when these parts are thus combined, the section H is provided with a handle, shown at R, Fig. 2.

O, Fig. 2 is a dark chamber which may be substituted for D, Fig. 1, intermediate between A and H, all three sections being disposed in line. A fits telescopically in O and H is attached to O as shown in Fig. 2 by thumb screws $u'$ $u'$ $u'$ $u'$ Fig. 10 corresponding to the slots in the projecting ends of H previously described.

The chamber O is closed at its posterior end by a blackened thin metal plate $g$, Figs. 2, 3, 4, 5, 9 and 10, having a perforation $h$ in its center, which may be any desired size or shape. In the drawings this perforation $h$ is represented as a circular opening about ¾ of an inch in diameter. To this perforated metal plate a circular disk is attached, which is revoluble upon a central pivot $i$, Figs. 2 and 4. This disk is perforated by a series of apertures $k'$. $k^2$. $k^3$. $k^4$. $k^5$. $k^6$. Fig. 4 which may be successively brought to coincide with $h$ and may be larger or smaller than $h$ or differ from it in shape as desired. In the drawing they are represented as circular and a little larger in diameter than $h$. One of these apertures indicated by $k'$, Fig. 4, is left uncovered. The others are covered by pieces of glass of various colors, or provided with other accessories. These objects may be V shaped as shown at $l'$ $l^2$ $l^3$ $l^4$ $l^5$ and affixed by clamps $m$ $m$ $m$ &c., arranged as shown in Fig. 4, or as the screws $n$ $n$ $n$ $n$ are disposed in Fig. 6. In the latter case the objects are easily removable or interchangeable.

Instead of the revoluble disk shown in Fig. 4 upon the metal plate $g$ forming the end of the chamber O a recess formed by a wooden frame $F^3$ $F^4$ $F^5$ and springs $b^2$ $b^2$ Figs. 9 and 10 may be provided similar in size to that shown in Figs. 1 6 and 7, and in which the ray filters such as G Fig. 1 or other accessories such as T Fig. 6 which fit in the recess F F' $F^2$ Figs. 1 6 and 7 may be inserted to cover the opening $h$ Figs. 2, 3, 9 and 10. Such of these accessories as are to be used while the chamber H is attached to O may be inserted and withdrawn through a door $K^2$ Fig. 2.

When the apparatus, as arranged in Fig. 2, is pointed toward the sun or when a suitable beam of light is otherwise directed into it normally through the lens I, the condensed rays pass through the small opening in the posterior end of O, and come to a focus about 1½ inches therefrom, within the chamber O.

Upon the under side of the section O is attached a small electro-motor S provided with a shaft which extends on one side about 1 inch beyond its bearing, vertically into the chamber O, centrally between its sides, and at about 1½ inches from the aperture in its posterior end. An electro-magnet is better adapted for this purpose if provided with a jewel or other hard bearing for the lower end of its shaft to rest upon, thus enabling it to run with less friction when the shaft is vertical. In the portable form of instrument shown in Fig. 2 the motor is to be operated by a current led by convenient flexible wires from a suitable small battery through a switch or key $v$, Fig. 2, conveniently situated, by which it may be started or stopped at pleasure. In place of the electromotor a high geared hand motor may be used but less effectively.

Upon the shaft of the electro-motor within the chamber O is fitted a light cylindrical box about 2¼ inches in diameter P, Figs. 2 and 3, open at the top and made preferably of aluminum, although a cardboard box with a bottom of wood about ⅜ of an inch thick is satisfactory. In the center of the bottom of this box is fixed a metal tapered socket o, Figs. 2 and 3, in which the shaft of the electro-motor fits by friction, so that it will be revolved by the motor but may be removed and replaced promptly, as may be desired, through an aperture in the chamber O directly over it, which is 3 by 4 inches in size, large enough to admit the hand, and provided with a light locked cover w, Fig. 2. This cover need not be hinged but is held in place by turn buckles only.

Opposite the aperture h, Fig. 2, in the posterior end of the chamber O, the cylinder P is perforated with one similar aperture r, Fig. 3, and the situation of the cylinder within the chamber O is such that the beam of light from the lens I comes to a focus about in the axis of the cylinder, when these openings coincide. In no position of the cylinder should any direct light be visible, through the eye shield, when the instrument is directed toward a source of light. Partitions Y Y, Fig. 5 projecting from the sides of the chamber O, and almost touching the cylinder, may be added to intercept the view of any light reflected from the cylinder upon the interior side of the metal plate g, Figs. 2, 3, 4 and 5, thus making the obscurity more complete. It is to provide against injury from the heat of the focus of the beam of light, that the posterior end of the chamber O and the cylinder are better made of metal, but if the light is excluded except while the cylinder is revolving, the latter suffers no injury even if made of cardboard.

The cylinder P, Figs. 2 and 3 is provided with a cover furnished with a central, perforated metal fitting p, Figs. 2 and 3, through which the wire shank of a suitable clamp may be inserted, adjusted as required and fixed in position by the screw q.

Several kinds of clamps or pincers are desirable. A claw clamp for holding a gem is shown at s, Fig. 3, adjusted as all should be to hold the object under inspection about opposite the opening in the cylinder. If the object thus supported within the cylinder is especially irregular in form, the clamp selected to hold it should permit of its adjustment so that its weight will be distributed around the axis as uniformly as possible to avoid difficulties from the centrifugal force accompanying its rapid revolution with the cylinder.

The door w, Fig. 2, is provided with a metal fitting x, similar to that in the cover of the cylinder, in which similar clamps may be inserted. When this is in use the cover of the cylinder is removed and the object held in a fixed position in the center of the cylinder and does not turn with it. This method of examination is more particularly applicable to transparent gems.

If the material to be examined, instead of being a single piece which may be held in the center of the cylinder as above described, is a powder, it may be dusted upon a strip of paper previously coated with glue or varnish, and when dry wrapped around the outside of the cylinder. The strip of paper should be as wide as the height of the cylinder and a little longer than its circumference, and held about the cylinder by a couple of rubber bands. The sanded surface should be the full length of the paper (or circumference of the cylinder) but need not be wider than the aperture h, Figs. 2, 3, and 4. Thus but a small quantity of material is sufficient. A solid cylinder of the material may be used if desired.

The accessory $1^4$ Figs. 4 and 6 and $1^6$ Figs. 9 and 10 is a so called spark gap lamp and is provided to permit the substitution of the light from high tension electric sparks for light from other sources, with either arrangement of the fluoroscope, Figs. 1 and 2. When this spark gap lamp is in use the lens chamber H may be laid aside. The spark gap lamp consists of a plate of insulating material, perforated with a rectilinear opening within which three or more iron balls are supported, nearly in contact. Although only three balls are shown, four or more may be used to provide for a greater number of sparks, when desired. In Fig. 4, it is fastened by clamps to the revoluble disk, either in place of, or superposed over a ray filter of the same size and shape, and is to be brought opposite the opening h, for use with the revoluble cylinder. In Fig. 6, the same appliance is held in place by the screws, n, n, n, n, over a central perforation in a sheet of thin wood, vulcanized fiber or hard rubber T, which fits into the rabbeted recess upon the side of the chamber D, in place of or superposed over the ray filter G, Fig. 1, as may be desired and to be used with specimens held in the chamber D Fig. 1. In Figs. 9 and 10 a similar lamp $1^6$ is shown attached to a like support $T^2$ in a recess $F^3$ $F^4$ $F^5$ similar to that above described but upon the end of the chamber O Fig. 2, to be used with the revoluble cylinder. The support $T^2$ with this form of the spark gap lamp and its accessories may also be inserted in the recess F $F^1$ $F^2$ Figs. 1, 6 and 7 to be used with the chamber D as above described.

The wires z z, Figs. 4, 6 and 10, are to be connected with a sufficiently capable induction coil and high tension electric sparks thus developed in the air gaps between the iron balls, the two outside balls being adjustable to regulate the air gaps and sparks as desired. When in use in a strongly lighted room, the spark gap lamp should be covered with a black cloth or a dark box in place of the chamber H, to exclude all other light than that of the spark. To serve this and also important additional purposes small cases made of ebonite, colored glass or other suitable material may be provided attachable easily to the insulating support of the spark gap lamp and only just large enough to inclose it. If the opening over which the spark gap lamp is adjusted is covered with a quartz plate and one of the little cases is provided with inlet and outlet tubes, being otherwise fairly air tight it may be kept filled with, and the sparks developed in gases other than air, and the composition of the light and the effects produced by it thereby varied at pleasure. A case of simple construction for this purpose is shown in Figs. 9 and 10 in which W is an ordinary wide mouthed bottle of amber glass with the bottom cut off, fitted upon a soft rubber band $d^2$ surrounding a shoulder of the support of the spark gap lamp $1^6$. It is closed with a soft rubber cork Z through which the inlet tube X and the outlet tube Y are inserted. Under the electrodes is a window of quartz $e^2$. To fill the case with any desired gas it is only necessary to connect the inlet tube (usually by means of a rubber tube) with a suitable apparatus for generating it. $f^2, f^3, f^4$, is a smaller recess in which the insulating support of the spark gap lamp $1^6$ and any ray filter desired may be inserted separately or together and from which the lamp may be lifted with facility to remove the quartz plate $e^2$ when necessary.

To use the apparatus arranged either as in Fig. 1 or Fig. 2 it may be held in the hand or mounted upon an equatorial telescope stand which need be only of the simplest construction as it may be well enough adjusted by hand, and thus directed toward the sun. Both these methods are more convenient in the winter when the sun is low than in the summer when the sun is high, and at all seasons it may more conveniently be placed horizontally upon a table at a suitable height for a seated observer to look in the eye shield, and a beam of sunlight from a heliostat or simply a reflecting mirror, or of light from an arc light lantern be directed into it. It is to be used in the latter position with the spark gap light.

The apparatus thus described is applicable as follows:—Arranged as in Fig. 1, it serves to disclose the direct fluorescence of gems and other objects held in the focus of intense light from the lens. The ray filter most used for the incident light should transmit only blue, violet and ultra-violet rays. The best two materials at present available for this purpose are a solution of ammonia sulfate of copper and a blue violet glass. The eye screen most used should have a color which appears yellow to the eye but which freely transmits red, orange, yellow, yellow-green and green, arresting the blue and violet colors of the spectrum. Ordinary yellow glass will answer fairly well, but a screen such as is used for a photographic color screen or for three color photography is superior. This screen is best made by coating a plate with gelatin, dyeing the latter with picric acid or some similar colored dye, drying it, applying a cover glass with balsam and mounting it with a binding in the manner of a lantern slide. The eye screen is more often necessary with the apparatus arranged as in Fig. 1 than in Fig. 2.

When arranged as in Fig. 2 the apparatus is applicable for showing the residual fluorescence or after glow of gems, minerals, fluorescent glass, ambers, and other substances as follows:—When a fluorescent object as an opaque gem is held by a clamp in the center of the cylinder, and the latter is in rapid revolution, each time the aperture in the cylinder faces the lens the light enters the cylinder and excites the fluorescence of the gem. When the aperture faces the eye shield, if the gem affords a residual fluorescence or after glow, the observer sees it glowing with the characteristic colored light thereof. When the gem is held in a clamp attached to the cylinder and revolves with it, the observer sees the side that had previously been illuminated. If it be a transparent gem held in a fixed position by a clamp attached to the cover of the fluoroscope, the observer sees its previously illuminated side through the gem. If the material be a powder sanded upon a strip of paper, wound around the cylinder, fresh portions of the powder are constantly illuminated on the side opposite the observer, and if the powder affords a residual fluorescence it is thus excited and appears as a band of colored light, girdling the cylinder. In all cases the observer sees these effects without apparent interruption, owing to the persistence of vision.

By the aid of this apparatus, arranged one way or the other, several gems may be distinguished from imitations and from each other, many minerals identified and distinguished from one another, optical glass selected, adulterations by mineral oils detected in the fixed oils, fluorescent dyes detected in food and other commercial products, and vice versa the relative absorption capacities of ray filters determined and the fluorogenic efficiency of light from various sources investigated.

The chambers D and O shown in the drawings and herein described as separate may be one and the same as all the parts of D may be attached to O and to then use O in place of D it is only necessary to remove the cylinder P by means of its taper socket and to cover the aperture $h$.

I herein use the term "residual fluorescence" to designate the same phenomenon that is also commonly called "phosphorescence" or an "afterglow."

Having now described the apparatus and its application what I claim and desire to patent is:

1. An apparatus for disclosing and exhibiting the residual fluorescence, afterglow, or so-called phosphorescence of any sensitive substance consisting of a revoluble perforated cylinder inclosed in a case provided with an aperture or window for its inspection; means for attaching a specimen of the material to be examined within, or upon the outside of the cylinder; means for producing and applying a suitable light to the specimen; and means for rotating the cylinder to expose the specimen alternately first to the light and then in obscurity to the view of the observer substantially as described.

2. In an apparatus for detecting and exhibiting the residual fluorescence of any fluorescent substance the combination of means for attaching a specimen of the material to, or supporting it within a perforated revoluble cylinder, inclosed in a case provided with an eye shield, means for producing and applying a suitable light to the specimen, and means for rotating the cylinder to submit the specimen alternately first to the light and then in obscurity to the view of the observer, substantially as described.

3. In an apparatus for detecting and exhibiting the residual fluorescence of any substance the combination of means for attaching a specimen of the material to a revoluble carrier in an inclosing case provided with an aperture or window for its examination, means for producing and applying a suitable light to the specimen, and a motor to rotate the carrier and thus expose the specimen alternately first to the light and then in obscurity to the view of the observer, substantially as described.

4. An apparatus for disclosing and exhibiting the comparative efficiency of the spark gap light developed in various gases for exciting the fluorescence and so-called phosphorescence of substances consisting of a case to inclose the material to be excited provided with an opening for its introduction; an eye shield for its observation; a revoluble carrier and shutter combined; means for attaching the material to the carrier or supporting it independently thereof; a motor to rotate the carrier; and a spark gap lamp over a window of quartz or other suitable material forming part of a small auxiliary case inclosing the spark gap lamp provided with inlet and outlet tubes for filling the case with various gases; and means for developing the sparks; substantially as described.

5. An apparatus for disclosing and exhibiting both the direct and residual fluorescence of substances, consisting of a case to inclose a specimen of the material to be examined provided with an opening for its introduction; an aperture or window for its examination; means for producing and applying the spark gap light developed in various gases, and for applying condensed ray energy from other sources, to the specimen, either simply held in the rays or attached to or supported within a rotating cylinder; means for attaching the specimen to the cylinder; ray filters to modify the incident rays and arrest unused rays reflected from the specimen; and means for rotating the cylinder to expose the specimen alternately, first to the exciting rays and then in obscurity to the view of the observer; substantially as described.

6. In an apparatus for the detection of fluorescent ingredients and adulterations in commercial products, the combination of an inclosing case provided with an opening for the introduction, and a window for the inspection, of the specimen; means for holding the specimen in direct light or alternately submitting it first to ray energy and then promptly in obscurity to the view of the observer; means for producing and applying suitable ray energy or condensing and applying suitable ray energy from other sources and ray filters to modify the incident rays and arrest unused rays reflected from the specimen.

WALLACE GOOLD LEVISON.

Witnesses:
FRANKLIN W. HOOPER,
CHARLES L. HARRINGTON.